Aug. 13, 1940.   M. TIBBETTS   2,211,182
INDICATOR FOR MOTOR VEHICLES
Filed March 2, 1939
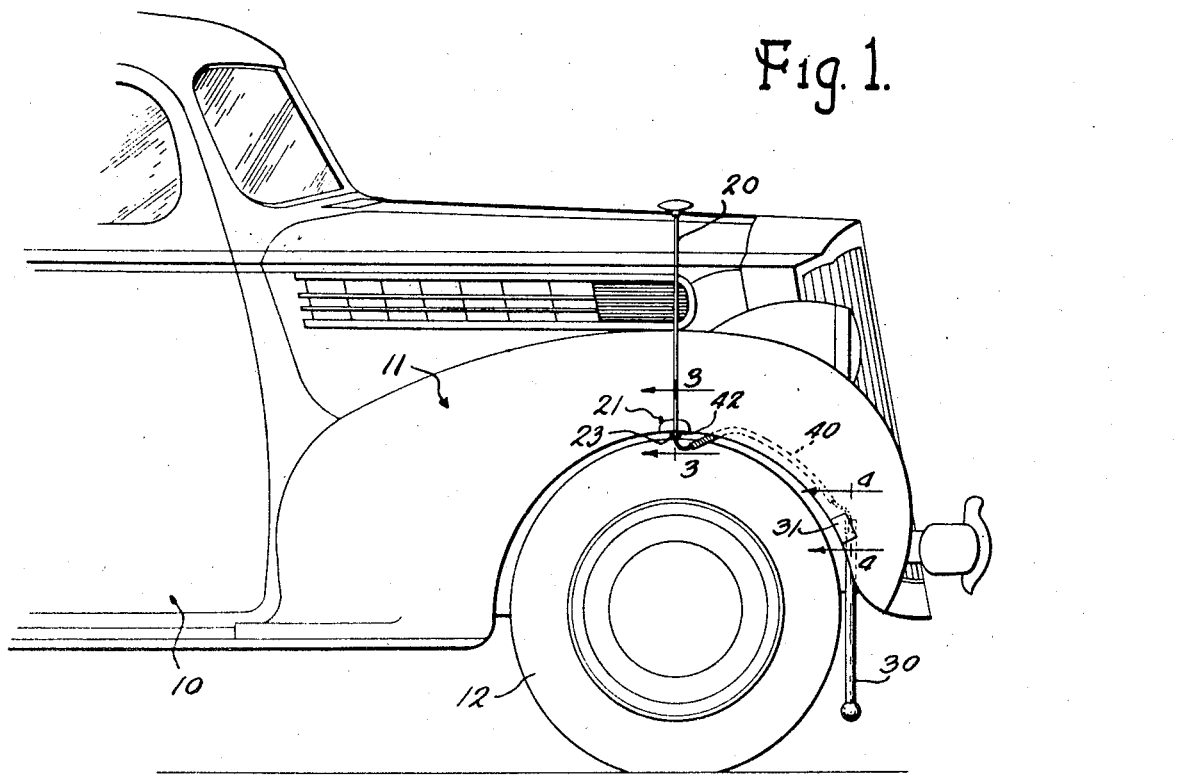
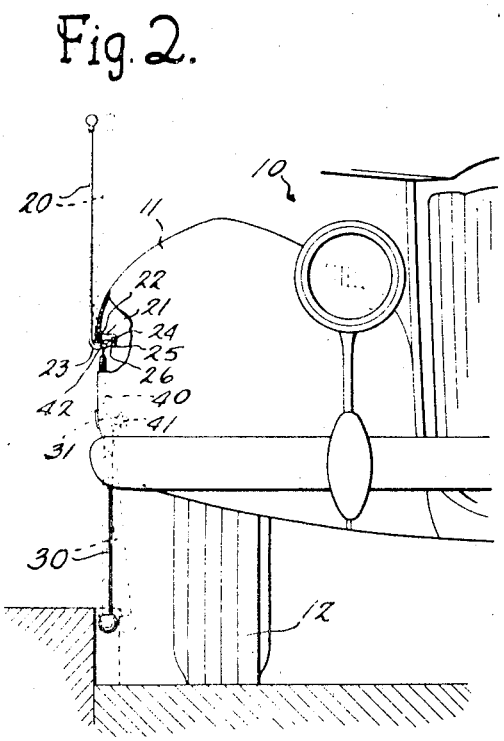
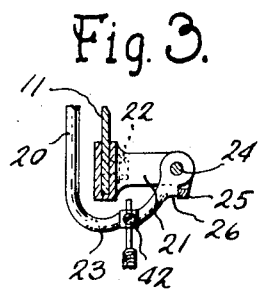
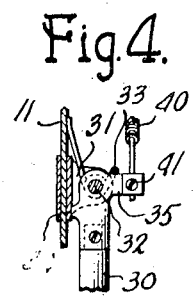
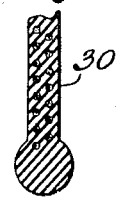
INVENTOR.
Milton Tibbetts
Tibbetts & Hart
ATTORNEYS Patented Aug. 13, 1940

2,211,182

UNITED STATES PATENT OFFICE 2,211,182

INDICATOR FOR MOTOR VEHICLES

Milton Tibbetts, Detroit, Mich., assignor to Packard Motor Car Company, Detroit, Mich., a corporation of Michigan Application March 2, 1939, Serial No. 259,405

6 Claims. (Cl. 116—28)

This invention relates to motor vehicles and particularly to means mounted on the vehicle for indicating to the driver when a wheel is approaching a street curb.

In present-day motor vehicles it is difficult for the driver of a left-hand drive car to judge the exact distance of the car from a street curb as the latter is approached by the car. This is especially difficult when backing into a parking place when the right rear wheel is approaching the curb, but it is also difficult to exactly place the right front wheel as the curb is approached with that end of the car.

It is usually desirable to park a vehicle within a few inches of but not touching a curb and there is an objection to first touching the curb with the side of the wheel and then pulling away from it the desired distance, because in doing so the sidewall of the tire is worn and sometimes cut by a jagged curb, and with the use of white sidewall tires a soiled tire results.

It is therefore one of the objects of the present invention to provide a simple device for a motor vehicle which will facilitate parking the vehicle close to but not touching the curb.

Another object of the invention is to provide means for "feeling" the curb before touching it with the wheels so that the driver may make a more perfect parking job.

Another object of the invention is to provide a curb indicating or feeling device which may be easily attached to and removed from a vehicle.

Other objects of the invention will appear from the following description taken in connection with the drawing, which forms a part of this specification, and in which:

Figure 1 is a side view of the forward part of a motor vehicle embodying the invention;

Figure 2 is a front elevation of a portion of the vehicle shown in Figure 1;

Figure 3 is a detail showing of the mounting of the indicator;

Figure 4 is a detail of the mounting of the curb contacting arm; and

Figures 5 and 6 are longitudinal sectional views of two forms of the contact arm.

Referring to the drawing, 10 indicates a motor vehicle and 11 is the right front fender thereof. The fender extends over the wheel 12 which is mounted adjacent one end of the vehicle. In the present instance the forward end of a vehicle is shown and consequently the forward fender and forward wheel, but it will be understood that the invention may also be applied to the rear part of a vehicle in substantially the same way as it will be shown as applied to the front portion of a vehicle.

The indicator of the device is shown in the form of an upright rod 20 pivoted on the fender so that its upper end is visible from the driver's position. A bracket for this rod is shown as detachably connected to the upper portion of the fender 11 and on the outer edge thereof. The bracket is indicated at 21 and one or more bolts 22 secure it to the fender edge. The bracket 21 extends inwardly somewhat from the fender and the rod 20 has its lower end bent as at 23 and is pivoted at 24 to the bracket 21. The bracket 21 has a stop 25 against which a lug 26 abuts for holding the rod 20 against outward movement and thus keeping it in an upright position except when the indicator is operated by the curb contacting device as hereinafter described.

The curb contacting device of this invention is shown in the form of a depending arm 30 and this arm is pivotally mounted on the vehicle between the end of the vehicle and the adjacent wheel. In the form shown it is mounted on the lower front portion of the fender 11 on a bracket 31 which is removably secured to the fender similar to the bracket 21. The arm 30 is pivoted to the bracket 31 at 32 and a spring 33 and a stop 34 yieldingly retain the arm in a substantially vertical position. This mounting of the arm 30 on the outer and lower edge of the fender 11 positions it forward of the wheel and several inches outwardly therefrom, so that as the wheel approaches a curb the arm 30 will contact the curb before the wheel does.

The arm 30 has a short arm 35 attached to it and extending inwardly from the pivot 32 so that as the arm 30 swings inwardly on its pivot, as by contacting a curb, the free end of the arm 35 will move upwardly for the purpose of operating the indicator.

Interconnecting means between the curb contacting device and the indicator is shown in the form of a Bowden wire 40, the casing of which is secured along the inside of the fender, the lower end of the wire of which is secured to the arm 35 as at 41 and the front end of the wire of which is secured to the rod 20 as at 42. These connections may be adjustable as by the screws shown so that when the rod 20 is against the stop 25 the arm 30 will also be against the stop 34, the latter being held yieldingly in that position by the spring 33.

Thus it will be seen that as the arm 30 is moved on its pivot by reason of contacting a curb the arm 35 will move upwardly and through the Bowden wire the rod will be tilted on its pivot 24, thus indicating to the driver the fact that his front wheel is close to but not in contact with the curb. As the car pulls away from the curb the arm 30 and rod 20 again straighten up and remain so until again brought into operation.

Figure 5 shows one form of the arm 30. It is preferably made of rubber reinforced by a steel rod 50 extending longitudinally throughout.

In Figure 6 the arm 30 is made of rubber with a reinforcing coil spring within it.

With either of these constructions the arm 30 will operate the indicator with the initial movement inwardly of the free end of the arm and any additional movement will cause the arm to bend and yield to the obstruction but return to its initial shape and position when the obstruction is removed.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

What is claimed is:

1. In a motor vehicle, the combination with the fender thereof of an indicating device mounted on the upper portion of said fender, a curb contacting device mounted on a lower portion of said fender forwardly and outwardly of the adjacent wheel, and means connecting said devices so that the movement of the curb contacting device will move the indicating device.

2. In a motor vehicle, the combination with the fender thereof, of an indicating rod pivoted in an upright position on the upper part of said vehicle fender, a curb contacting arm pivoted to and depending from the lower forward portion of said fender in a position so that its free end will contact a curb before the adjacent wheel, and connecting means between the rod and the arm for moving said rod as said arm is moved by contact with a curb.

3. A curb indicating device for a motor vehicle comprising a pivoted indicator for mounting on a vehicle, a curb contacting element for separate pivotal mounting on the vehicle, and a mechanical operating connection from said element to said indicator.

4. In a motor vehicle, the combination with the fender thereof, of an indicating device mounted on the fender and visible to the driver, a curb contacting device mounted on a lower portion of the fender and nearer the end of the vehicle than the indicating device, and an operating connection between the curb contacting device and the indicating device.

5. In a motor vehicle, the combination with the fender thereof, of an indicating device mounted on the fender and visible to the driver, a curb contacting device mounted on a lower portion of the fender and nearer the end of the vehicle than the indicating device, and interconnecting means between said devices for moving the indicating device inwardly as the curb contacting device is moved inwardly.

6. In a motor vehicle, the combination of the fender thereof, an indicating device mounted on the upper part of the fender and arranged to pivot inwardly towards the middle of the vehicle, a curb contacting device mounted on a lower portion of the fender and nearer the end of the vehicle than the indicating device, and an operating connection between said devices so arranged that as the curb contacting device is moved inwardly the indicating device will also move inwardly to indicate the true movement of the curb contacting device.

MILTON TIBBETTS.